United States Patent
Demmler et al.

(10) Patent No.: US 12,361,073 B2
(45) Date of Patent: *Jul. 15, 2025

(54) SYSTEMS AND METHODS FOR ENHANCED CONTENT MANAGEMENT INTEROPERABILITY SERVICES INTERFACES AND REPOSITORY INTEGRATION

(71) Applicant: Open Text SA ULC, Halifax (CA)

(72) Inventors: Thomas Demmler, Constance (DE); Szabolcs Gyula Mile, Munich (DE)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,858

(22) Filed: Jan. 18, 2023

(65) Prior Publication Data

US 2023/0153363 A1 May 18, 2023

Related U.S. Application Data

(63) Continuation of application No. 16/118,072, filed on Aug. 30, 2018, now Pat. No. 11,562,033.

(51) Int. Cl.
| | |
|---|---|
| G06F 16/93 | (2019.01) |
| G06F 16/16 | (2019.01) |
| G06F 16/28 | (2019.01) |
| G06F 40/134 | (2020.01) |
| G06Q 10/067 | (2023.01) |

(52) U.S. Cl.
CPC ............ *G06F 16/94* (2019.01); *G06F 16/16* (2019.01); *G06F 16/288* (2019.01); *G06F 40/134* (2020.01); *G06Q 10/067* (2013.01)

(58) Field of Classification Search
CPC ........ G06F 16/94; G06F 16/16; G06F 40/134; G06F 16/288; G06F 16/93; G06F 16/28; G06F 17/22; G06Q 10/067; G06Q 10/06
See application file for complete search history.

(56) References Cited

U.S. PATENT DOCUMENTS

| | | | | |
|---|---|---|---|---|
| 6,868,425 | B1* | 3/2005 | Bergstraesser | G06F 16/289 |
| 9,262,450 | B1* | 2/2016 | Connolly | G06F 16/81 |
| 2004/0143606 | A1* | 7/2004 | Pauly | G06F 16/25 |
| 2016/0132528 | A1* | 5/2016 | Roubaud | G06F 16/156 |
| | | | | 707/626 |
| 2016/0239465 | A1* | 8/2016 | Gilboa | G06F 9/451 |

* cited by examiner

*Primary Examiner* — Ken Hoang
(74) *Attorney, Agent, or Firm* — Sprinkle IP Law Group

(57) ABSTRACT

Systems and methods related to the seamless integration of Content Management Interoperability Services (CMIS) client systems with native data models of repositories that may be utilized with such client systems are disclosed. In particular, certain embodiment of systems and methods for the integration of CMIS compliant client systems with CMIS compliant ECM systems by conforming CMIS secondary types utilized by CMIS clients to the native ECM artifacts utilized by the ECM system are disclosed.

19 Claims, 10 Drawing Sheets

SYSTEMS AND METHODS FOR ENHANCED CONTENT MANAGEMENT INTEROPERABILITY SERVICES INTERFACES AND REPOSITORY INTEGRATION

CROSS-REFERENCE TO RELATED APPLICATIONS

This is a continuation of, and claims a benefit of priority under 35 U.S.C. § 120 from, U.S. patent application Ser. No. 16/118,072, filed Aug. 30, 2018, entitled "SYSTEMS AND METHODS FOR ENHANCED CONTENT MANAGEMENT INTEROPERABILITY SERVICES INTERFACES AND REPOSITORY INTEGRATION," issued as U.S. Pat. No. 11,562,033, which is fully incorporated by reference herein.

TECHNICAL FIELD

This disclosure relates generally to information management. More particularly, embodiments disclosed herein relate to an inventive versatile and extensible solution for integrating information across disparate data sources such as information systems. Even more specifically, embodiments disclosed relate to the seamless integration of Content Management Interoperability Services (CMIS) client systems with native data models of repositories that may be utilized with such client systems.

BACKGROUND

It has been a long standing goal of various entities, including governmental, commercial, vendor and consulting organizations to increase interoperability between computerized information systems. In particular, one goal has been to facilitate interoperability (or more generally information exchange) between Enterprise Content Management (ECM) systems or clients of such ECMs. To help achieve such a goal, Content Management Interoperability Services (CMIS) was developed.

CMIS is an open standard that allows different content management systems to inter-operate over the Internet. CMIS defines an abstraction layer that allows different content management systems and applications/systems that use such content management systems (referred to interchangeably as CMIS clients, applications or client systems) to inter-operate over the Internet using web protocols. Specifically, CMIS provides a data or domain model referred to as the CMIS data model and includes a set of services for adding and retrieving documents or objects according to such a domain model. By providing a simplified and standardized way to access unstructured content across an enterprise environment the integration of disparate client systems and content management systems can be facilitated at least because application or clients can be developed in a repository independent manner.

However, the use of CMIS in such enterprise environments is not without its problems. In particular, in many cases, ECM systems operate according to their own proprietary domain models. In other words, an ECM system may operate based on its own set of artifacts that may or may not be congruous with the CMIS domain model. The ECM may offer increased functionality, solutions or other content services relative to those offered through the CMIS services. The degree of content services offered by an ECM may thus be unavailable in certain instances for objects stored at the ECM in association with a CMIS client application or system. This situation may arise, at least in part, because of the non-conformity between CMIS and the native domain model of the ECM system utilized as a repository by the CMIS client.

It is thus desirable to improved integration of CMIS clients with an associated repository, at least to offer the full suite of content management functionality of an ECM system in association with objects stored using CMIS by a CMIS client.

SUMMARY

To those ends, among others, embodiments may facilitate creation of artifacts conforming to an ECM's native domain model in the ECM based on CMIS interactions from a client system, including CMIS Create, Read, Update or Delete (CRUD) operations. As discussed, CMIS is an open standard that provides a data or domain model referred to as the CMIS data model and includes a set of services for adding and retrieving documents or objects according to such a domain model. In contrast, in many cases, ECM systems operate according to their own proprietary domain models that may or may not be congruous with the CMIS domain model.

The ECM may offer increased functionality, solutions or other content services relative to those offered through the CMIS services. Moreover, the ECM may be accessible by application or users through other applications or systems (e.g., according to the ECM's native data model) such that the ECM may offer its full (or an increased) suite of content services when so accessed. In fact, in some instances objects (e.g., documents) created or stored by a CMIS client at an ECM system may themselves be accessed orthogonally to the CMIS systems that created these objects. Accordingly, even when accessed from these outside application or systems, the full complement of content services offered by an ECM may be unavailable in certain instances for objects stored at the ECM in association with a CMIS client application or system. This situation may arise, at least in part, because of the non-conformity between CMIS and the native domain model of the ECM system utilized as a repository by the CMIS client.

This situation is further complicated by the use of CMIS secondary types. These secondary types allow the runtime definition, creation or addition of new object types to the CMIS domain model being utilized by a given client system. By allowing runtime creation of new object types any desired integration of the CMIS domain model with the native ECM domain model is made more difficult, as the number of secondary types that may be created or used by a CMIS client is usually not known at runtime, and may change dynamically during runtime.

A microcosm of these problems occur in certain contexts. For example, typically, in enterprise computing environments, certain systems manage certain aspects of the business. For example, Enterprise Resource Planning (ERP) systems manage business processed for an enterprise, while human resources management (HR) systems manage the relations about employees (e.g., who is an employee's direct manager, which HR administrators are assigned to which employees, and so on). Examples of such systems are SAP® business applications such as SAP S4/HANA or SAP SuccessFactors®, which is a cloud-based HR system. Such systems typically do not manage content. Rather, enterprise content, including unstructured content such as work permit documents, sick leave documents, or social security correspondence emails, are managed by other enterprise class systems, such as ECM systems. In many cases, these business applications may be CMIS compliant client systems, meaning they interact with the ECM being used as a repository using CMIS. To facilities their operations, these business applications may therefore utilize a number of CMIS secondary types. It would thus be desirable to offer the full (or an enriched) suite of content services offered by the ECM system being used as a repository to objects of these secondary types and moreover, to allow access to these objects, even from systems or applications that are not CMIS compliant (e.g., but which may be compliant with the domain model utilized by the ECM system).

Embodiments of the systems and methods presented herein may thus integrate CMIS compliant client systems with CMIS compliant ECM systems by conforming CMIS secondary types utilized by CMIS clients to the native ECM artifacts utilized by the ECM system. Specifically, in certain embodiments, an ECM may be configured to recognize a CMIS request for the creation of a CMIS secondary type that is based on a particular base object (referred to as a custom CMIS secondary type or custom secondary type) and update an artifact configuration in the ECM system with artifact configuration data for that secondary type. This artifact configuration data may associate the secondary type with the specific client system that created that secondary type, specify the native ECM artifact to create for that secondary type and an artifact template for creation of that native artifact. The template can specify a structure, such as other native ECM artifacts, that should be created in association with the native ECM artifact to create for that secondary type.

The ECM may also maintain distinct object hierarchies, a CMIS specific structure and an ECM specific structure. The CMIS specific structure may maintain a hierarchy of objects specific to the CMIS objects created by the CMIS client system while the ECM specific structure may maintain an associated hierarchy of native ECM specific artifacts. A set of mapping relationships may link CMIS objects within the CMIS specific structure to corresponding ECM specific artifacts within the ECM specific structure. When the artifact configuration is updated by the ECM system (e.g., upon receiving a request for the creation of the CMIS object of a secondary type), a CMIS object in the CMIS specific structure may be created for that secondary type and a corresponding artifact representing that CMIS secondary type may be created in the ECM specific structure.

When a subsequent CMIS request for creation of an instance of this secondary type is received from the CMIS client system, it can be determined that there is an artifact configuration for this CMIS secondary type and the artifact configuration accessed to determine the type of artifact specified to create for that CMIS secondary type. In one embodiment, if one exists the template for the artifact to create may be accessed in the artifact configuration. A CMIS object for the requested instance of the secondary type may be created in the CMIS specific structure. Additionally, a native ECM artifact of the type specified for the CMIS secondary type may be created in the associated hierarchy of native ECM artifacts in the ECM specific structure. The native ECM artifact may be created, for example, according to the artifact template specified for that secondary type in the artifact configuration.

The native ECM artifact for the instance of the secondary type created in the ECM specific structure may be associated (e.g., beneath or a sub-node) with the ECM artifact in the ECM specific structure representing the CMIS secondary type. Moreover, a set of mapping relationships mapping CMIS objects in the CMIS specific structure to corresponding native artifacts in the ECM specific structure may be updated to link the CMIS object created for the instance in the CMIS specific structure with the native ECM artifact in the ECM specific structure. In this manner, the ECM artifact for that instance in the ECM specific structure may be easily located when access or reference to that CMIS instance (or CMIS secondary type) are utilized in subsequent CMIS requests received from the client system.

Accordingly, when a CMIS request is received to store content such as a CMIS document associated with the created instance of the CMIS secondary type, the document may be actually stored in the ECM specific structure in association with the ECM artifact linked to the CMIS object for that instance of the secondary type in the CMIS specific structure. In particular, when a request to create or store a CMIS document associated with the instance of the CMIS secondary type is received at the ECM system the CMIS specific structure may accessed to locate the CMIS object corresponding to the instance of that CMIS secondary type and the set of mapping relationships mapping CMIS objects in the CMIS specific structure to corresponding native artifacts in the ECM specific structure may accessed to determine any link between the CMIS object created for the instance in the CMIS specific structure and any native ECM artifact in the ECM specific structure. Using the link, the corresponding ECM artifact in the ECM specific structure may be located and the document stored in association with (e.g., beneath or a sub-node of) the native ECM artifact created for that instance of the CMIS secondary type. Moreover, a CMIS object for that document may be created in the CMIS specific structure in association with the CMIS object for the instance of the secondary type and the set of mappings updated to link the CMIS object for the document in the CMIS specific structure with the ECM artifact in the ECM specific structure.

In the manner described according to embodiments, native ECM artifacts may be created that correspond to created CMIS secondary types and documents stored and managed according to the native artifacts and structures of an ECM system, while allowing access and interaction with CMIS client systems according to the CMIS protocol and domain model. Moreover, because such artifacts and documents are created, managed and stored according to the native ECM domain model the full suite of functionality and interfaces offered by the ECM may be made available with respect those artifacts and documents from a wide variety of systems or applications that may, or may not, interact with the ECM system according to CMIS or the ECM systems native interfaces. As these native artifacts may be created for different custom secondary types embodiments may allow these different custom secondary types to be managed and accessed according to both the CMIS protocol and the full suite of functionality offered by the ECM system. Additionally, the systems or applications that interact with the ECM system to access such ECM artifacts and documents may do so despite the fact that the artifacts and documents being accessed were created based on CMIS interactions from a CMIS client system. Embodiment may therefore provide the advantage of not only enabling interoperability through the use of CMIS with CMIS clients, but to extend such interoperability to other systems that do not conform to CMIS, while in many cases preserving the functionality of the ECM while doing so.

In some embodiments, an ECM system may include a CMIS interface, a ECM services interface; and a repository storing a CMIS specific structure, an ECM specific structure and a set of mapping relationships. The ECM system may receive a first request to create a first custom secondary type from a CMIS compliant leading system through the CMIS interface, where the first custom secondary type is based on a secondary type object defined in CMIS. The ECM system can determine that a native artifact should be created for the first custom secondary type and update artifact configuration data to associate the first custom secondary type with the CMIS leading system and the native artifact. A first object can be created in the ECM specific structure corresponding to the first custom secondary type. When a second request to create an instance of the first custom secondary type from the CMIS leading system is received, the artifact configuration data can be accessed to determine that the native artifact should be created for the first custom secondary type.

A second object of the first custom secondary type can be created in the CMIS specific structure in a portion of the CMIS specific structure corresponding to the CMIS leading system, and a first instance of the native artifact created in the ECM specific structure as a sub node of the first object in the ECM specific structure corresponding to the first custom secondary type. The set of mapping relationships can be updated to associate the first object of the first custom secondary type in the CMIS specific structure with the first instance of the native artifact in the ECM specific structure. The ECM system can allow interaction with the first object of the first custom secondary type in the CMIS specific structure through the CMIS interface and interaction with the first instance of the native artifact in the ECM specific structure through the ECM services interface.

In embodiment, when a third request to create a document from the CMIS leading system is received in association with the second object of the of the first custom secondary type, the second object of the first custom secondary type in the portion of the CMIS specific structure corresponding to the CMIS leading system may be located. It can be determined, based on the mapping relationships, that the second object in the CMIS specific structure is associated with the first instance of the native artifact in the ECM specific structure that is a sub-node of the first object in the ECM specific structure corresponding to the first custom secondary type. The document can be stored in the ECM specific structure in association with the first instance of the native artifact in the ECM specific structure that is a sub node of the first object in the ECM specific structure corresponding to the first custom secondary type and a virtual document created in the CMIS specific structure in association with the second object of the first custom secondary type the portion of the CMIS specific structure corresponding to the CMIS leading system. The mapping relationships can be updated to link the virtual document in the CMIS specific structure with the document in the ECM specific structure. The ECM may allow interaction with the document in the ECM specific structure through the CMIS interface using the virtual document in the CMIS specific structure and interaction with the document in the ECM specific structure through the ECM services interface.

In certain embodiment, determining that a native artifact should be created for the first custom secondary type, comprises determining that the first custom secondary type inherits from a base custom secondary type. The base custom secondary type may be, for example, a sapbo:boBase secondary type. The native artifact may be, for example, a workspace.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
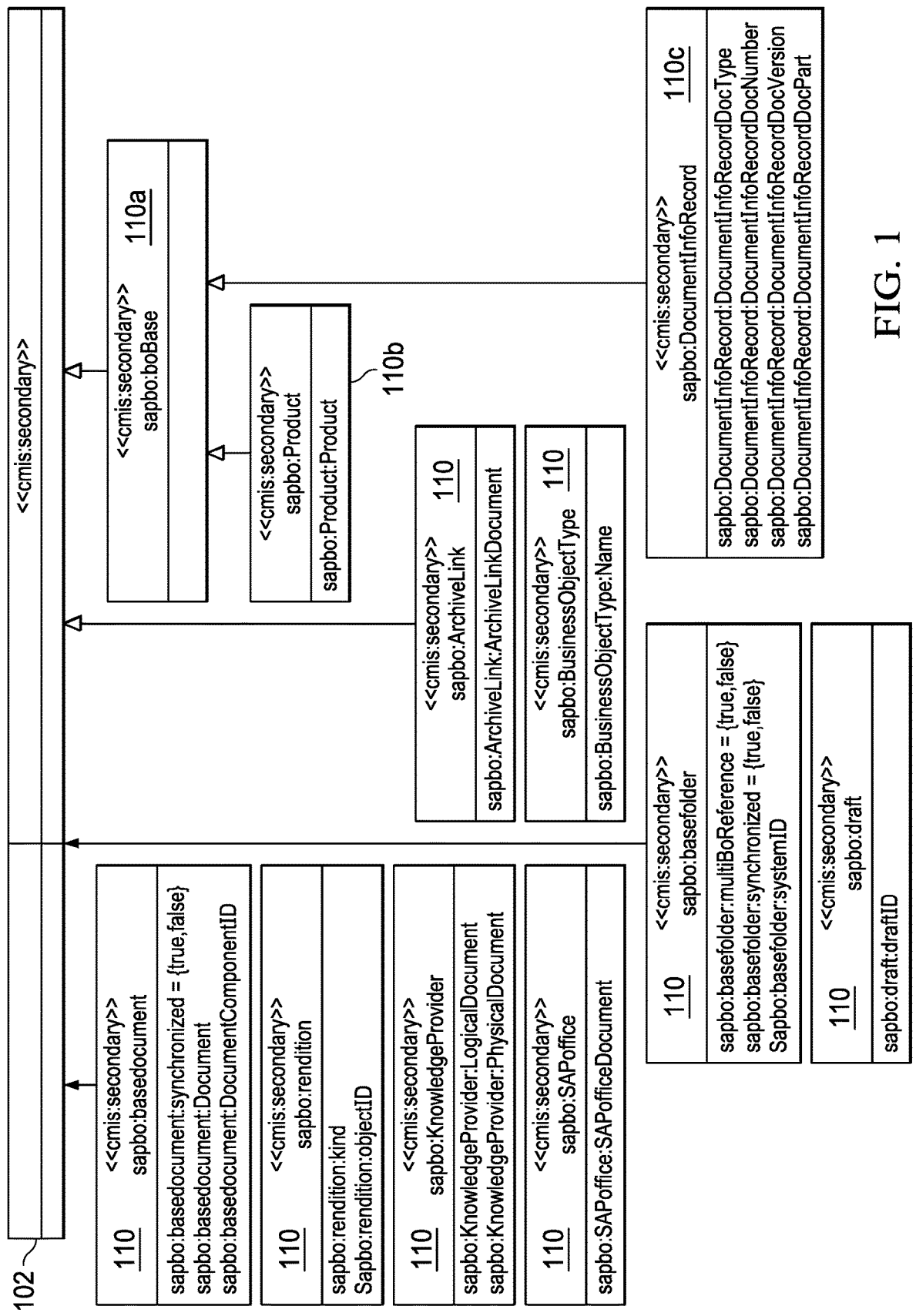
FIG. 1 is a block diagram of one example of a set of CMIS secondary types.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before describing embodiments in more detail, however, it may be helpful to provide an some additional context related to such embodiments. As discussed, CMIS is an open standard that provides a data or domain model referred to as the CMIS data model and includes a set of services for adding and retrieving documents or objects according to such a domain model. The CMIS data model covers typed files and folders with generic properties that can be set or read. The CMIS data model is based on a common view regardless of the architectures of the "backend" systems used as repositories. Consequently, CMIS does not define how such repositories or content management systems can be mapped to the CMIS data model. Furthermore, these backend systems may have different expressions of the CMIS data model in which key-value pairs in the CMIS data model may be exposed differently from system to system. Accordingly, in many cases, ECM systems that are used as these backend systems for CMIS client applications or CMIS systems operate according to their own proprietary domain models that may or may not be congruous with the CMIS domain model.

This situation is further complicated by the use of CMIS secondary types. These secondary types allow the runtime definition, creation or addition of new object types to the CMIS domain model being utilized by a given client system. By allowing runtime creation of new object types any desired integration of the CMIS domain model with a native ECM domain model is made more difficult, as the number of secondary types that may be created or used by a CMIS client is usually not known at runtime, and may change dynamically during runtime. For example, typically, in enterprise computing environments, certain systems manage certain aspects of the business. For example, Enterprise Resource Planning (ERP) systems manage business processed for an enterprise, while human resources management (HR) systems manage the relations about employees (e.g., who is an employee's direct manager, which HR administrators are assigned to which employees, and so on). Examples of such systems are SAP® business applications such as SAP S4/HANA or SAP SuccessFactors®, which is a cloud-based HR system. Such systems typically do not manage content. Rather, enterprise content, including unstructured content such as work permit documents, sick leave documents, or social security correspondence emails, are managed by other enterprise class systems, such as ECM systems. In many cases, these business applications may be CMIS compliant client systems, meaning they interact with the ECM being used as a repository using CMIS. To facilities their operations, these business applications may therefore utilize a number of CMIS secondary types.

Turning to FIG. 1, then, a representation of one example of a set of secondary types (e.g., custom secondary types) that may be utilized by SAP® CMIS client systems or applications is illustrated. Notice here, that these secondary types 110 may all be dependent, "inherit" or be sub-types (these terms will be used herein interchangeably) of the CMIS secondary type 102. Such CMIS secondary types 110 are not, for example, part of the standard definition of the CMIS data model, but are instead created by the CMIS client system at runtime. Specifically, a SAP® CMIS client system may send a create type request to the repository system during operation to create these secondary types. The repository system may then have to create such a secondary type 110 in accordance with the CMIS protocol, and be able to create and manage objects of these secondary types 110 during runtime. As will be noticed, certain base secondary types (e.g., secondary type sapbo:boBase 110a) may be provided where other secondary types that may be sub-types of a that secondary type (e.g., secondary type sapbo:Product 110b and secondary type sapbo:DocumentInfoRecord 110c) can be created by a CMIS client system. It will be understood, then, that an arbitrarily complex set of secondary types having varying degrees of dependencies may be created by a CMIS client system during operation and the repository system that conforms to CMIS may be responsible for creating such secondary types and creating and managing objects of such secondary types.

Figure 2:
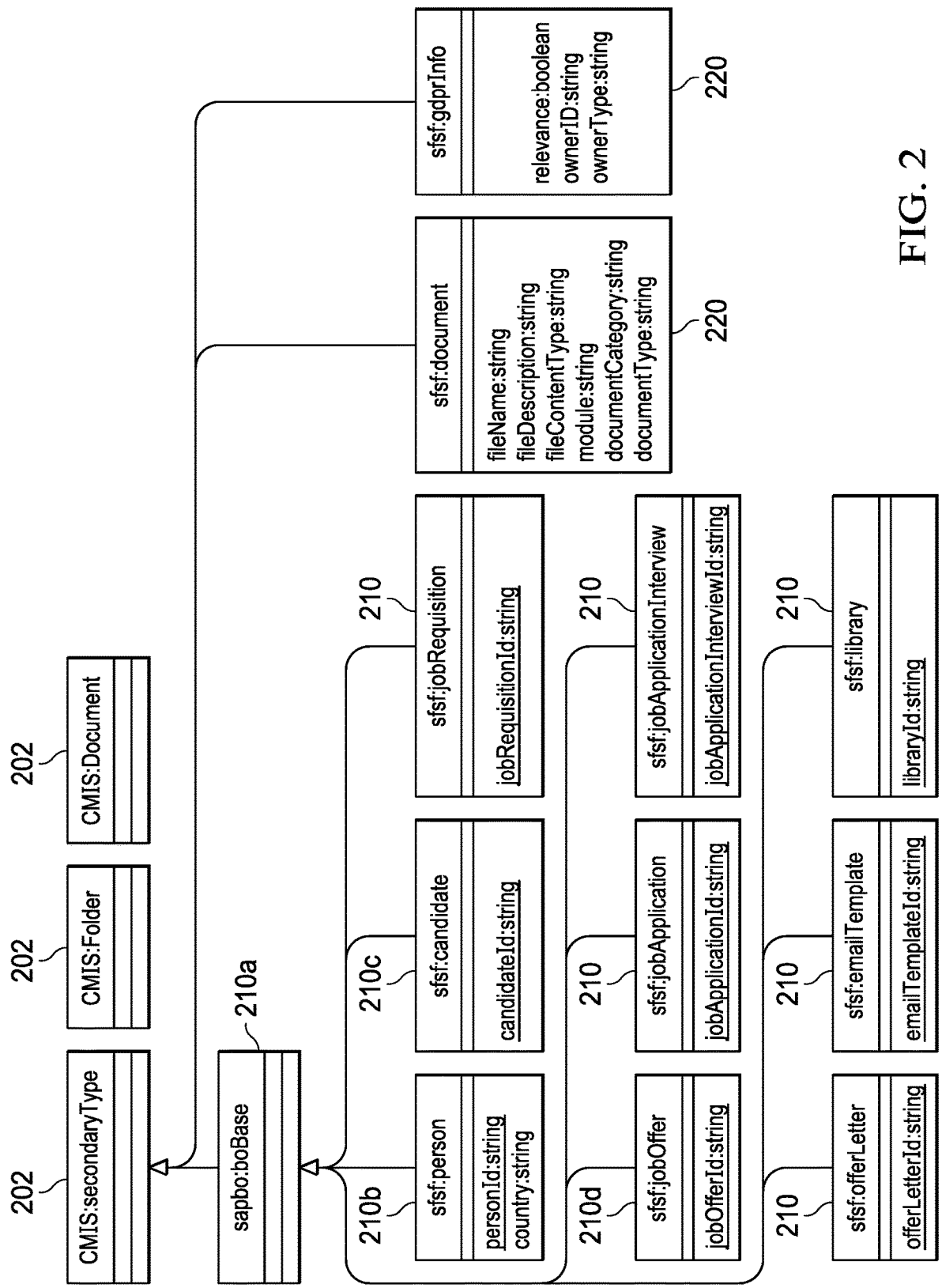
FIG. 2 is a block diagram of one example of a set of CMIS secondary types.

FIG. 2 depicts a representation of another example of secondary types, where these secondary types may be utilized by a SAP SuccessFactors® (SFSF) client application or system. Here, in addition to the standard object types 202 provided by the standard CMIS, SFSF may utilize a set of custom secondary types 210 that inherit from the sapbo:boBase secondary type 210a. For example, such secondary types utilized by SFSF may include sfsf:person secondary type 210b, sfsf:candidate secondary type 210c, sfsf:jobOffer secondary type 210d, among others. It should be noted here that while certain secondary types utilized by SFSF may be sub-types of the sapbo:boBase secondary type, other custom secondary types 220 may also be used by SFSF such as the sfsf:document custom secondary type and the sfsf:gdprinfo custom secondary type.

While custom secondary types may be used by certain CMIS client applications, the back end repositories may offer increased functionality, solutions or other content services relative to those offered through the CMIS services. Moreover, an ECM system utilized as a repository for a CMIS client application may be accessible by application or users through other applications or systems according to the such that the ECM may offer its full (or an increased) suite of content services when so accessed. In fact, in some instances objects (e.g., documents) created or stored by a CMIS client at an ECM system may themselves be accessed orthogonally to the CMIS systems that created these objects. Accordingly, even when accessed from these outside application or systems, the full complement of content services offered by an ECM may be unavailable in certain instances for objects stored at the ECM in association with a CMIS client application or system. This situation may arise, at least in part, because of the non-conformity between CMIS and the native domain model of the ECM system utilized as a repository by the CMIS client and is further exacerbated by the use of CMIS custom secondary types used during runtime by a given client system.

It would thus be desirable to offer the full (or an enriched) suite of content services offered by the ECM system being used as a repository to objects of these secondary types and moreover, to allow access to these objects, even from systems or applications that are not CMIS compliant (e.g., but which may be compliant with the domain model utilized by the ECM system).

Embodiments of the systems and methods presented herein may thus integrate CMIS compliant client systems with CMIS compliant ECM systems by conforming CMIS secondary types utilized by CMIS clients to the native ECM artifacts utilized by the ECM system. Specifically, in certain embodiments, an ECM may be configured to recognize a CMIS request for the creation of a CMIS secondary type that is based on a particular base object and update an artifact configuration in the ECM system with artifact configuration data for that secondary type. This artifact configuration data may associate the secondary type with the specific client system that created that secondary type, specify the native ECM artifact to create for that secondary type and an artifact template for creation of that native artifact. The template can specify a structure, such as other native ECM artifacts, that should be created in association with the native ECM artifact to create for that secondary type.

Figure 3:
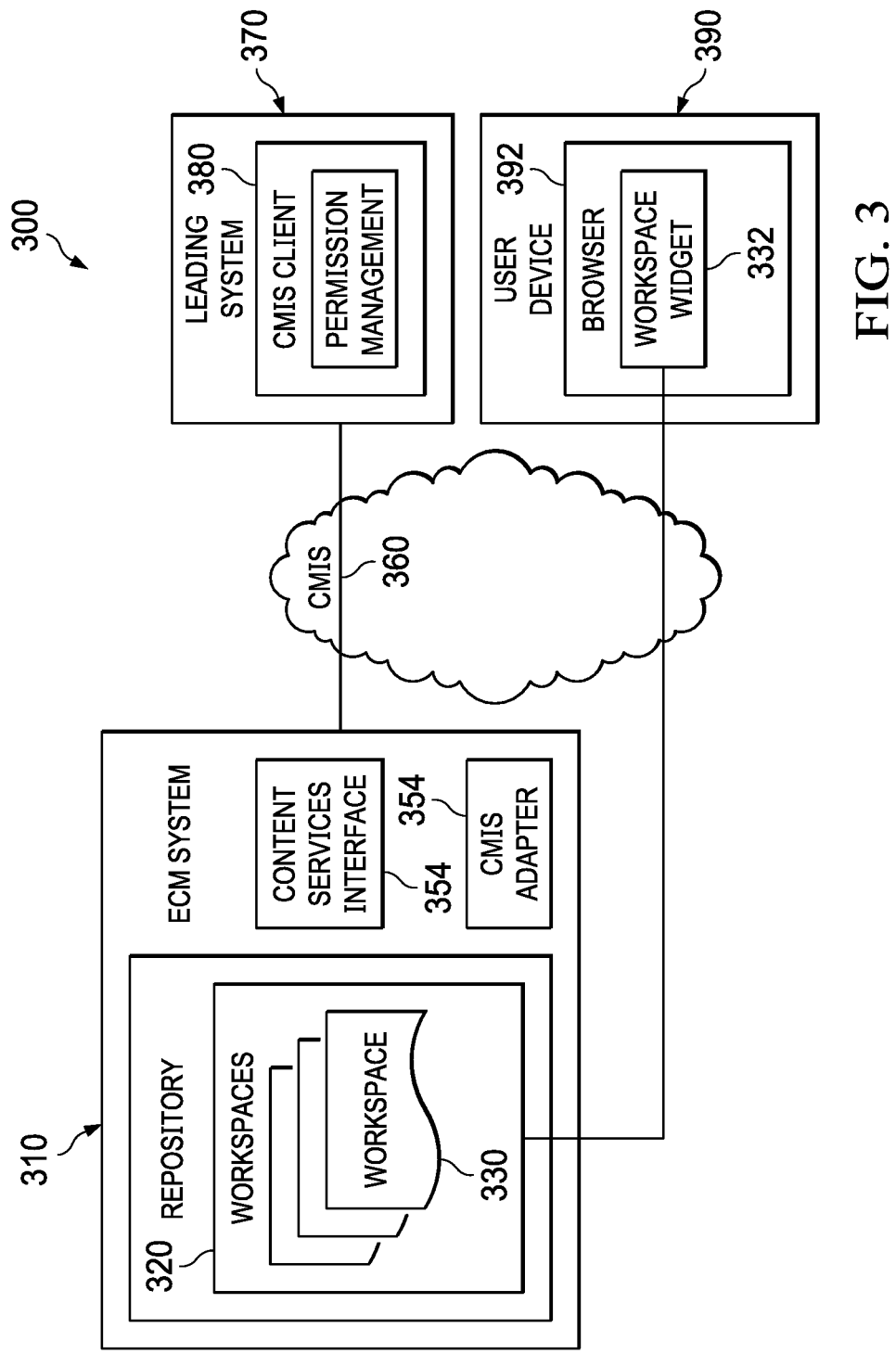
FIG. 3 is a block diagram of an example network computing environment where embodiments can be implemented.

Referring now to FIG. 3, a diagrammatic representation of an example network computing environment 300 where embodiments disclosed herein can be implemented. In this example, network computing environment 300 has a repository system 310 and a leading system 370. As an example, repository server 310 may be an ECM system (also referred to as a content manager, ECM system, or content monument system) such as OpenText™ Extended ECM Platform, and leading system 370 may implement an SAP® business application such as SAP SuccessFactors®, which is a cloud-based HR system.

Although not shown in FIG. 3, leading system 370 can include core HR modules such as payroll, employee benefits, time off and record keeping; talent management modules such as employee performance management, compensation management, succession management, learning, recruiting, onboarding, workforce planning, and workforce analytics; and employee engagement tools such as collaboration and social media. In the example of FIG. 3, leading system 370 is shown to have a permission management module 380 that manages and maintains permission information such as user-manager relations, role-based rule definitions (or rules), and user-group associations for users of leading system 370. As a non-limiting example, permission management module 380 can be part of SAP SuccessFactors® Employee Central (which has a suite of HR applications).

In the example of FIG. 3, as a cloud-based system, leading system 370 may also be accessible by a user through a browser application 392 running on a user device 390. In some cases, leading system 370 may be integrated with an information management solution provided by ECM system 310. While leading system 370 can, to some extent, allow its users to create and store certain documents (e.g., employee records, leave request forms, etc.), at its core, leading system 370 manages relationships and not documents. In an enterprise setting, users of leading system 370 must deal with large volumes of enterprise content, including correspondences, various types of documentation, contracts, records, and so on. The information management solution provided by ECM system 310 can be leveraged by leading system 370 to capture, manage, store, preserve, and deliver the large volumes of enterprise content to the right user, at the right place, and at the right time.

As an example, the information management solution provided by ECM system 10 may include an ECM system workspace widget 332 that can be presented to a user of leading system 370 as part of a web-based user interface (UI) of leading system 370 running within browser 392 on user device 390. This workspace widget 332 may interact with the ECXM system 310 through one or more content services interfaces 354 provided by the ECM system 310. As an example, through UI integration between ECM system 310 and leading system 370, ECM system workspace widget 332 may be presented as a "tile" or icon on a user's SAP application launch pad or home page.

As illustrated in FIG. 3, ECM system workspace widget 332 is supported by ECM system 310. ECM system 310 can provide a rich set of features and a repository in an enterprise computing environment. Examples of such content features can include, but are not limited to, document management, content navigation, search, editor, workflow, collaboration, content reporting, etc. To support such features, the ECM system 310 may employ a native data model comprising native artifacts. In the example of FIG. 3, ECM system 310 also provides a special artifact 330 referred to herein as "workspaces" or a "workspace." OpenText™ Connected Workspaces is an example of workspaces 320. Users of ECM system 310 can access these features through a UI of ECM system 310. ECM system 310 may also have permission management that manages access privileges of users of ECM system 310.

A workspace can be considered a type of container in which documents and other content objects can be stored, managed, and accessed. There can be different types of workspaces (e.g., enterprise workspaces, employee workspaces, etc.). These workspaces 320 can be used to offer a wide suite of functionality by the ECM system 310. For example, responsive to ECM system 310 extending ECM to leading system 370, users of leading system 370 are provided with workspaces 330 which they can access through workspace widget 332. For example, when an employee is hired and entered into leading system 370, an employee workspace can be created in ECM system 310 for the new hire. An employee workspace can be used by an enterprise employee to work and aggregate associated data, content, people, and tasks to a common function, for instance, a project, or even a community of people with common interests. Workspace templates can ensure that folders, metadata, records management, and permissions are automatically created and applied in the background and can provide enhanced deployment flexibility, helping enterprise information technology (IT) specialists to better align ECM to the needs of their enterprise, making end users more effective and improve overall system performance.

As discussed previously, ECM system 310 and leading system 370 are fundamentally different systems—they are designed for different purposes, have different functions, and operate independently from one another. One of the key differences has already been discussed, namely that the leading system 370 may be a CMIS based client system such as SAP SuccessFactors® that interacts with ECM system 310 (through CMIS adapter 352) using CMIS 360 to use ECM system as a repository, while ECM system 310 may offer increased functionality, solutions or other content services relative to those offered through the leading system 370 using a native data model having native artifacts while still offering CMIS compatibility. It would thus be desirable to offer the full (or an enriched) suite of content services offered by the ECM system 310 in association with types or objects created through CMIS interactions with the leading system 370. Moreover, it is desirable to allow access to these objects, even from systems or applications that are not CMIS compliant (e.g., but which may be compliant with the domain model utilized by the ECM system) such as workspace widget 332.

Figure 4:
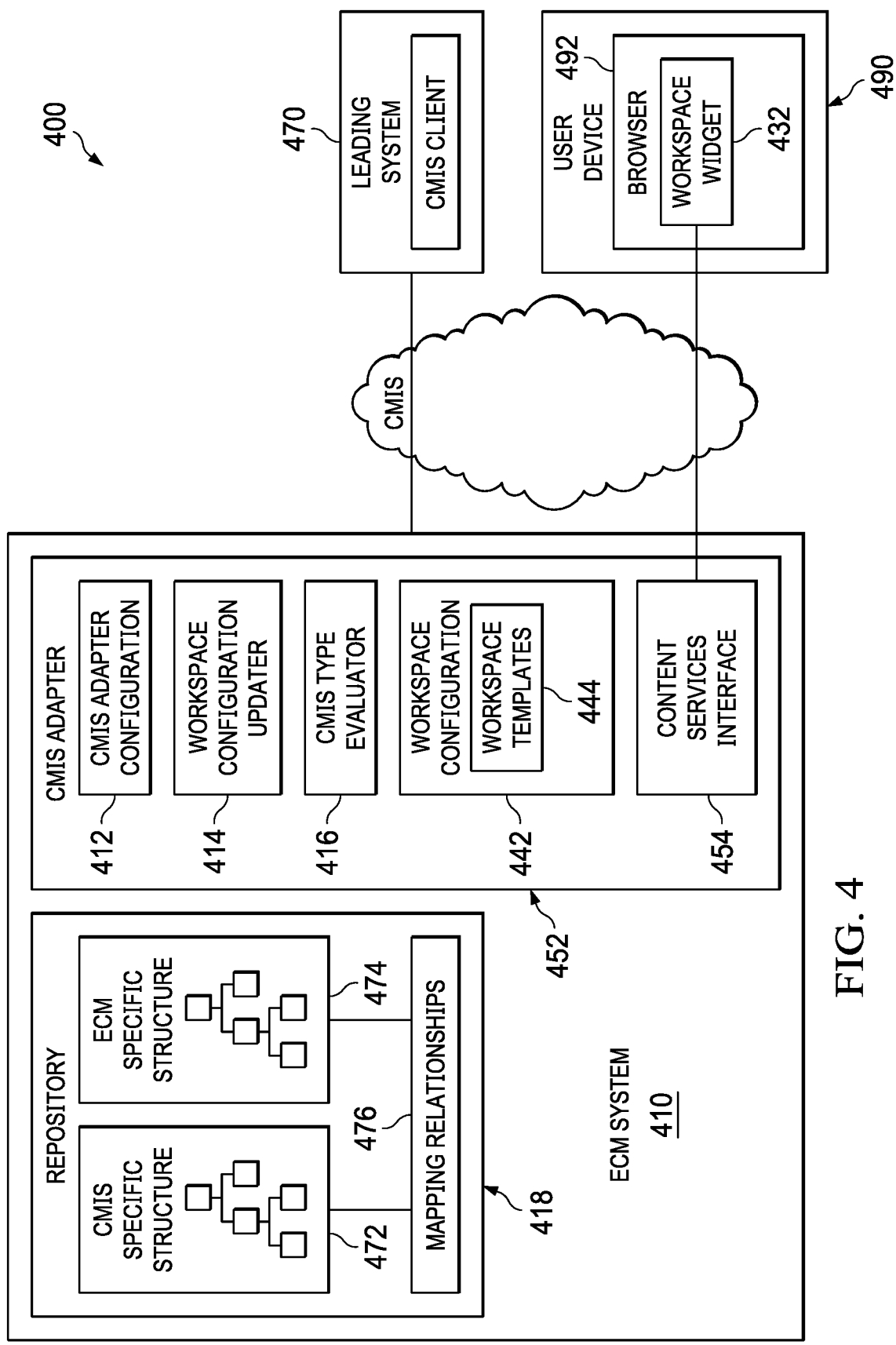
FIG. 4 is a block diagram of an example network computing environment including an embodiment of an ECM system.

FIG. 4 depicts a network computing environment that includes one embodiment of an ECM system 410 adapted to do just that. In particular, embodiments of ECM system 410 may integrate CMIS compliant client system (leading system) 470 with ECM system 410 by conforming CMIS secondary types utilized by CMIS client system 470 to the native ECM artifacts utilized by the ECM system 410. It should be noted here that while embodiments as described herein may be described with respect to workspace artifacts as, for example, utilized in OpenText™ Connected Workspaces, in general embodiments may be applied to any artifacts utilized by ECM systems generally and these descriptions should not be taken as limits on embodiments as described and disclosed.

As described, ECM system 410 is coupled to CMIS client system (leading system) 470 over a computer network such that CMIS client system 470 and ECM system 410 interact via CMIS through CMIS adapter 452. A workspace widget 432 may interact with the ECM system 410 through one or more content services interfaces 454 provided by the ECM system 410. These content server interface 454 may offer a wider or different degree of functionality than that offered through the CMIS protocol offered through CMIS adapter 452. In some embodiments, when CMIS requests are received according to the CMIS protocol at CMIS adapter 452 the CMIS adapter 452 may translate or otherwise compose a corresponding request to content services interface 454 to implement the received CMIS request.

The CMIS client system 470 may have a particular repository or section of repository 418 and may be treated as a user of the ECM system 410 with a corresponding name. Data associated with CMIS client system 470 may thus be stored in the repository 418 under a folder or folders with corresponding names (e.g., the name of the external system or user associated with the CMIS client system 470). ECM system 410 may also maintain distinct object hierarchies in the repository 418, a CMIS specific structure 472 and an ECM specific structure 474.

The CMIS specific structure 472 may maintain a hierarchy of objects specific to the CMIS objects created by the CMIS client system 470 while the ECM specific structure 474 may maintain an associated hierarchy of native ECM specific artifacts. A set of mapping relationships 476 may link CMIS objects within the CMIS specific structure 472 to corresponding ECM specific artifacts within the ECM specific structure 474. These mapping relationships may be relationships that associate object identifiers for objects in the CMIS specific structure 472 to corresponding object identifiers for ECM specific workspaces within the ECM specific structure 474. These relationships may be CMIS relationships of a particular type such that they have a particular semantic meaning associating a CMIS object with a workspace (e.g., a cmis:bo-workspace relationship). Thus, objects created and stored by leading system 470 using CMIS may actually be maintained, managed and accessed using associated ECM artifacts in ECM specific structure 474.

In certain embodiments, ECM system 410 may be configured to recognize a CMIS request for the creation of a CMIS secondary type that is based on a particular base object and update an artifact configuration in the ECM system with artifact configuration data for that secondary type. CMIS adapter 452 may include a CMIS adapter configuration 412. This CMIS adapter configuration 412 may specify those CMIS secondary types for which an associated native ECM artifact is to be created. The CMIS adapter configuration 412 may thus include a list of one or more names of secondary types for which all instances of those types (or instances of type that inherit from that type) should have an ECM native artifact created and associate type of ECM native artifact that should be created for that secondary type. The CMIS adapter configuration 412 may be created, accessed or updated by, for example, an administrative user accessing the ECM system 410 through an administrative interface (not shown).

In one embodiment, the CMIS client system 470 may be a SAP® business applications such as SAP S4/HANA or SAP SuccessFactors®, which utilizes business objects (BOs) based on a custom secondary type such as the sapbo:boBase (as depicted in FIGS. 1 and 2). Accordingly, it may be desirable to create workspace artifacts in ECM system 410 for all secondary types of type sapbo:boBase or for secondary types that are sub-types of sapbo:boBase. In this example, the CMIS adapter configuration 412 may specify the secondary type sapbo:boBase and a workspace native ECM artifact. It will be noted that such an adapter configuration 412 may include specific configurations for different leading systems. Thus, for example, it may be desirable to create one type of native ECM artifact for one custom secondary type for one leading system and another type of native ECM artifact for another secondary type from another leading system. Other configurations that may be specified by CMIS adapter configuration 412 are fully contemplated here.

Workspace configuration 442 may include the ECM specific configuration needed by the ECM system 410 to create and manage native artifacts (e.g., workspaces) for CMIS secondary types. This workspace configuration data 442 may associate the secondary type with the specific client system that created that secondary type, specify the native ECM artifact to create for that secondary type and an artifact template for creation of that native artifact. The template can specify a structure, such as other native ECM artifacts, that should be created in association with the native ECM artifact to create for that secondary type.

Embodiments of such a configuration may include a hierarchy of ECM native artifacts representing categories of secondary types for which native artifacts are being created where those categories may be associated with the named leading system 470, a workspace template 444 specifying how the native artifact for the secondary type is to be created, an artifact type for that secondary type and other configuration artifacts that may utilized by the ECM system 410 to create or manage native artifacts for a secondary type. Each of the templates 444 included in the workspace configuration 442 may initially be a default (or empty) template for a workspace. A user may subsequently access a template 444 of the workspace configuration 442 to alter the workspace template 444. In this manner, a specific type of structure of workspace may be created by the ECM system 410 for particular secondary types.

Accordingly, when a CMIS request for creation of a secondary type is received from the CMIS client system 470 (e.g., a create type request) CMIS type evaluator 416 may receive the request, determine the secondary type (and possibly any base or parent secondary types from the request) and access the CMIS adapter configuration 412 to determine if the secondary type is a secondary type (or sub-type of a secondary type) for which a workspace should be created. For example, it can be determined if the request for a creation of a secondary type is a request for creation of a type of sapbo:boBase or a secondary type that inherits from this secondary type (e.g., sfsf:person).

If the received create secondary type request is not associated with a CMIS secondary type specified in the CMIS adapter configuration 412, the CMIS adapter 452 may handle the create secondary type request in a normal manner for ECM system 410 (e.g., it may update CMIS specific structure 472). If however, the requested secondary type is associated with a secondary type specified in the CMIS adapter configuration 412 the CMIS adapter 452 may update the workspace configuration 442 based on the secondary type being created using workspace configuration updater 414. This update may include the creation of one or more ECM artifacts in the configuration 442 representing the category of the secondary type, the type of workspace to be created for instances of that secondary type, that the secondary type being created is of a particular secondary type and a template 444 for creation of a workspace for instances of that secondary type. This template may be a default template for workspaces as maintained by the ECM system 410.

When the workspace configuration 442 is updated by the CMIS adapter 452 of the ECM system 410 (e.g., upon receiving a request is received for the creation of the CMIS object of a secondary type), a CMIS object in the CMIS specific structure 472 may be created for that secondary type and a corresponding artifact representing that CMIS secondary type may be created in the ECM specific structure 474.

As CMIS adapter 452 receives requests from the leading system 470 according to CMIS, the CMIS adapter 452 receives requests for creation of instances of secondary types. The CMIS adapter 452 analyzes a request for creation of instances of a secondary type to determine if that secondary type is a secondary type for which a workspace (e.g., an instance of a workspace) should be created. This determination may be made by accessing the workspace configuration 442 and determining if the secondary type of the CMIS object being created is in the workspace configuration is association with the leading system 470. For example, it can be determined if a received CMIS request is for a creation of an object of a secondary type of sapbo:boBase or a secondary type that inherits from this secondary type (e.g., sfsf:person) by accessing the workspace configuration using an identifier for the leading system 470 and determining if an artifact representing that secondary type is included in the workspace configuration 442. Alternatively, this may be done by accessing the CMIS adapter configuration to see if the secondary type is listed in the configuration of the CMIS adapter 452.

If the received request for creating a CMIS object (e.g., folder) of the secondary type is not associated with a CMIS secondary type specified in the workspace configuration 442 in association with the leading system 470, the CMIS adapter 452 may handle the create object of secondary type request in a normal manner for ECM system 410 (e.g., it may update CMIS specific structure 472). If, however, the received request for creating a CMIS object of the secondary type is associated with a secondary type specified in the workspace configuration 442 in association with the leading system 470, the CMIS adapter 452 may update both the CMIS specific structure 472 and the ECM specific structure 474 based on the object creation request. A CMIS object for the requested instance of the secondary type may be created in the CMIS specific structure 472. Additionally, a native ECM workspace (e.g., an instance of a native workspace) specified for the requested CMIS secondary type may be created in the associated hierarchy of native ECM artifacts in the ECM specific structure 474. Specifically, the template for the workspace to create for the secondary type specified in the request may be accessed in the workspace configuration 442 and the native ECM workspace artifact may be created, for example, according to the workspace template specified for that secondary type in the workspace configuration 442.

The native ECM workspace artifact for the instance of the secondary type created in the ECM specific structure 474 may be associated (e.g., beneath or a sub-node) with the ECM artifact in the ECM specific structure 474 representing the CMIS secondary type. Moreover, mapping relationships 476 mapping CMIS objects in the CMIS specific structure 472 to corresponding native workspaces in the ECM specific structure 474 may be updated to link the CMIS object created for the instance in the CMIS specific structure 472 with the workspace created for that object in the ECM specific structure 474. In this manner, the ECM workspace for that instance in the ECM specific structure 474 may be easily located when access or reference to that CMIS object (or CMIS secondary type) are utilized in subsequent CMIS requests received from the CMIS client system 470.

As CMIS adapter 452 receives requests from the leading system 470 according to CMIS, the CMIS adapter 452 receives requests for creation of documents, items, folder or otherwise to store content in association with a created instance of a secondary type. Accordingly, when a CMIS request is received to create content (e.g., such as a CMIS document) from the leading system 470, the CMIS adapter 452 can determine if the request specifies a secondary type or an object of that secondary type for which a native workspace exists in the ECM specific structure 474. Such a determination may be made, for example, by CMIS adapter 452 accessing the CMIS specific structure 472 to locate the object in the CMIS specific structure 472 corresponding to the CMIS object referenced in the received CMIS create document request.

Based on the object in the CMIS specific structure 472 located it can be determined if a corresponding workspace object exists in the ECM specific structure 474 using mapping relationships 476 by determining if any link between the CMIS object created for the instance in the CMIS specific structure 472 and any native ECM workspace in the ECM specific structure 474 exists. In particular, an identifier for the CMIS object in the CMIS specific structure 472 may be used as an index into the mapping relationships 476 to determine if a relationship of a particular type (e.g., a BO-Workspace or BO-BO relationship) exists between that CMIS object and any workspace. Using this link, the corresponding ECM workspace in the ECM specific structure 474 may be located and the document stored in association with (e.g., beneath or a sub-node of) the native ECM workspace created for that object of the CMIS secondary type. Moreover, a CMIS object or other type of entry for that document may be created in the CMIS specific structure 472 in association with the CMIS object for the object of the secondary type. In one embodiment, the set of mappings 476 may also be updated to link the CMIS object or entry for the document in the CMIS specific structure 472 with the document in the ECM workspace in the ECM specific structure 474.

When access requests for that object or document (e.g., a get object request) are received from the leading system 470 the corresponding object may be accessed in CMIS specific structure 472. Using the mapping relationships 476 or other links linking the corresponding object in CMIS specific structure 472 to the corresponding native workspace or object (e.g., document) in the ECM specific structure 474, the requested object may be accessed and the content returned in response to the request to the leading system 470.

In this manner, native ECM workspace artifacts may be created that correspond to created CMIS secondary types and documents stored and managed according to the native workspace artifacts and structures of ECM system 410, while allowing access and interaction with CMIS client systems 470 according to the CMIS protocol and domain model. Moreover, because such workspace artifacts and documents are created, managed and stored according to the native ECM domain model of ECM system 410 the full suite of functionality and interfaces offered by the ECM system 410 may be made available with respect those workspace artifacts and documents from a wide variety of systems or applications that may, or may not, interact with the ECM system 410 according to CMIS.

Moreover, the systems or applications that interact with the ECM system 410 to access such ECM workspace artifacts and documents may do so despite the fact that the workspaces and documents being accessed were created based on CMIS interactions from a CMIS client system 470. Embodiments may therefore provide the advantage of not only enabling interoperability through the use of CMIS with CMIS clients (e.g. leading system 470), but to extend such interoperability to other systems that do not conform to CM IS, while in many cases preserving the functionality of the ECM while doing so.

In the illustrated embodiment, for example, workspace widget 432 can be presented to a user of leading system 470 as part of a web-based user interface (UI) of leading system 470 running within browser 492 on user device 490. This workspace widget 432 may interact with the ECM system 410 through one or more content services interfaces 454 provided by the ECM system 410. These content server interface 454 may offer a wider or different degree of functionality than that offered through the CMIS protocol offered through CMIS adapter 452. In particular, these native interfaces 454 of the ECM system 410 may provide a rich set of features including but not limited to, the features of working with workspaces and implementing document management, content navigation, search, editor, workflow, collaboration, content reporting, etc. in conjunction with such workspaces. As an example, through UI integration between ECM system 410 and leading system 470, ECM system workspace widget 432 may present, as "tiles" or icons, workspaces for interaction in such an interface.

Thus, through the ECM workspace widget 432 utilizing native interface 454 a user may interact with workspaces in objects in ECM specific structure 474 and access the full complement of functionality and features offered by native interface 454 and workspace widget 432, despite that those workspaces and objects were created based on the CMIS protocol. Thus, by creating such native workspaces and objects based on CMIS interactions, the functionality and features of ECM system 410 may, in many ways, be extended to cover objects and types created through the CMIS protocol. Moreover, as the CMIS specific structure 472 and associated mapping relationships are maintained, these advantages come at no expense with respect to the CMIS interoperability, compatibility or functionality offered by the ECM system 410.

It will now be useful to illustrate embodiments of methods that may be employed by embodiments of an ECM system or a CMIS adapter of an ECM system to enhance the interoperability of content management services offered by the ECM system. As mentioned previously, an ECM system may be configured to allow access from a leading system. In some embodiments, this configuration may entail creating a representation of the external system (e.g., the leading system) and a user corresponding to the external system, where the external system and user may be referred to by the same name. This configuration may be performed by an administrator using, for example, a user interface offered by the ECM system. A CMIS connection between the ECM system and the leading system may also be configured by the administrator (or otherwise). In this manner, a leading system may access the ECM system using CMIS as a user of the ECM system.

When such as an external system is configured, a repository, volume or folder of the repository at the ECM system may be assigned or created for the external system and named accordingly (e.g., may have the name of the external system of user associated with the external system. This repository or volume may be a specific sub-folder inside an enterprise volume (e.g., a volume dedicated to the enterprise of which the leading system may an entity). Data associated with the configured CMIS client system may thus be stored in the repository of the ECM system under a folder or folders with corresponding names (e.g., the name of the external system or user associated with the CMIS client system).

An administrator may also configure the ECM system by specifying those CMIS secondary types for which an associated native ECM workspace artifact is to be created. The administrator may thus configure the ECM with a list of one or more names of secondary types for which all instances of those types (or instances of type that inherit from that type) should have an ECM workspace created. In one embodiment, the leading system (CM IS client system) may be a SAP® business applications such as SAP S4/HANA or SAP SuccessFactors®, which utilizes business objects (BOs) based on a custom secondary type such as the sapbo:boBase (as discussed previously). Accordingly, it may be desirable to create workspace artifacts in ECM system for all secondary types of type sapbo:boBase or for secondary types that are sub-types of sapbo:boBase. The administrator may thus configure the ECM system by specify that for each object that is of secondary type sapbo:boBase (or in based on this secondary type) a workspace should be created.

Figure 5:
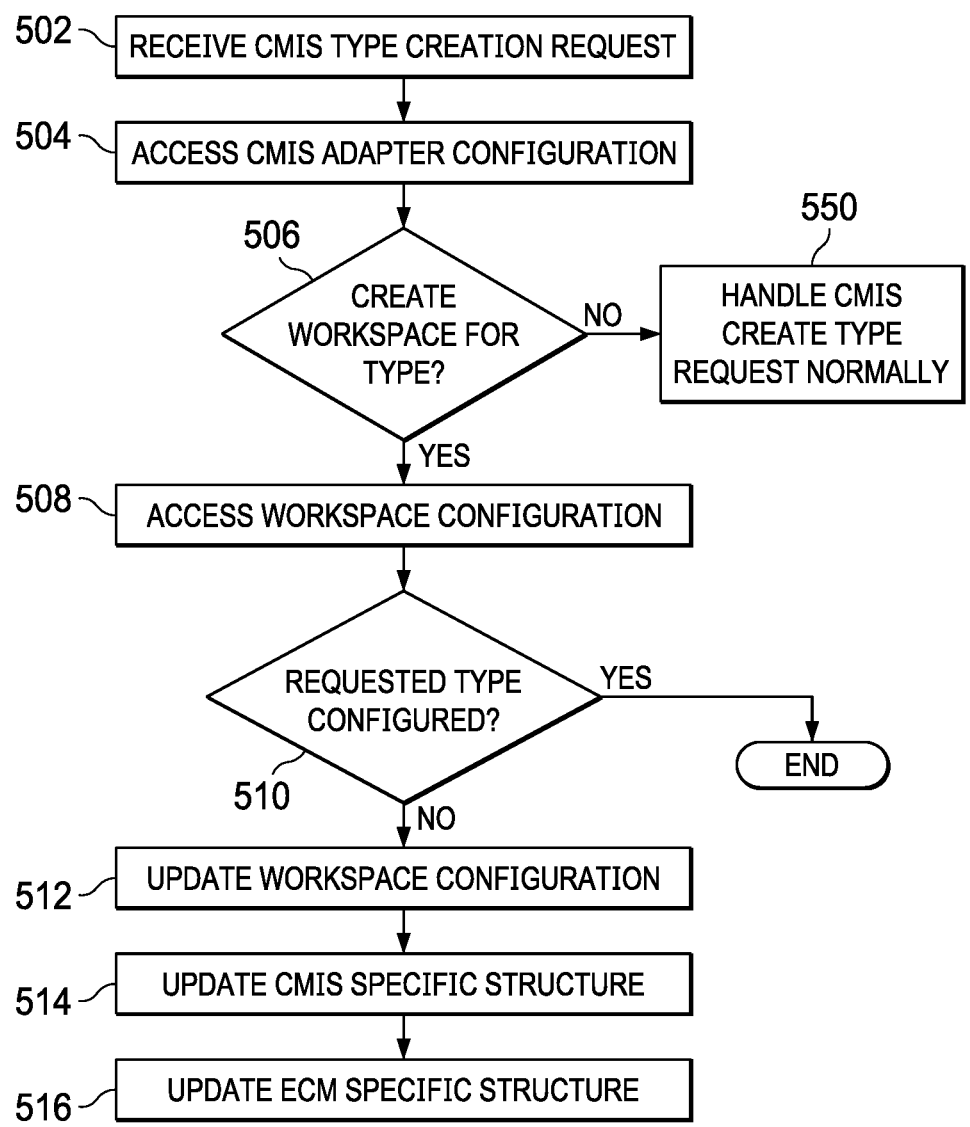
FIG. 5 is a flow diagram of a method that may be implemented by an embodiment of an ECM system.

Looking now at FIG. 5, one embodiment a method for creation of a CMIS secondary type in an ECM system that provides enhanced content management interoperability is depicted. When a CMIS request for creation of a secondary type is received from the CMIS client system (e.g., a create type request) (step 502), the ECM system may receive the request, determine the secondary type of the request (and possibly any base or parent secondary types from the request) and access the CMIS adapter configuration (step 504) to determine if the secondary type is a secondary type (or sub-type of a secondary type) for which a workspace should be created (step 506). The received request may also be associated with the name of the external system (or associated user) that submitted the request). Accordingly, such a determination may also be based on the specific leading system that made the request. For example, it can be determined if the request for a creation of a secondary type is a request for creation of a type of sapbo:boBase or a secondary type that inherits from this secondary type (e.g., sfsf:person).

If the received create secondary type request is not associated with a CMIS secondary type specified in the CMIS adapter configuration (N branch of step 506), the create secondary type request may be handled in a normal manner by the ECM system (e.g., it may update CMIS specific structure (step 550). If however, the requested secondary type is associated with a secondary type specified in the CMIS adapter configuration (e.g., is example, a request for creation of a type of sapbo:boBase or a secondary type that inherits from this secondary type such as sfsf:person), the ECM system may update the workspace configuration based on the secondary type being created. In particular, a CMIS workspace configuration may be accessed at the ECM system (step 508).

Embodiments of such a workspace configuration may include the ECM specific configuration needed by the ECM system to create and manage workspaces for CMIS secondary types. This workspace configuration data may thus associate a secondary type with the specific client system that created that secondary type, specify the native ECM workspace to create for that secondary type and a workspace template for creation of that workspace. The template can specify a structure, such as other native ECM artifacts (e.g., sub-folders or objects), that should be created in association with the native ECM workspace to create for that secondary type.

Accordingly, once the workspace configuration is accessed (step 508) it can be determined if the workspace configuration has already been updated for a workspace for the requested secondary type. This determination can be made, for example, by accessing one or more artifacts (e.g., folders) associated with the name of the external system (or user) to determine if there are any sub-artifacts (e.g., categories, folders, types, etc.) associated with the name of the requested secondary type (e.g., sapbo:Person). If the workspace configuration already contains entries for workspaces for the external system and the requested secondary type no further action may be taken (Y branch of step 510).

If, however, the workspace configuration does not contain entries for a workspace for the external system and the requested secondary type (N branch of step 510) the workspace configuration may be updated (step 512). This update may include the creation of one or more ECM artifacts in the workspace configuration representing the category of the requested secondary type, the type of workspace to be created for instances of that secondary type, that the secondary type being created is of a particular secondary type and a template (e.g., a workspace template) for creation of a workspace for instances of that secondary type. This template may be a default template for workspaces as maintained by the ECM system. Such a default template may be reconfigured or modified by an administrator of the ECM system at a later point, if desired Additionally, when the workspace configuration is updated by the ECM system (e.g., upon receiving a request is received for the creation of the CMIS object of the secondary type), a corresponding CMIS object in a CMIS specific structure at the ECM that maintains a hierarchy of objects specific to created CMIS objects may be created for that secondary type (step 514). That CMIS object may be created in an area or portion of the CMIS specific structure that corresponds to the enterprise or leading system that issued the request for the secondary type. A corresponding artifact representing that CMIS secondary type may also be created in the ECM specific structure at the ECM that maintains an associated hierarchy of native ECM specific artifacts (step 516).

Figure 6:
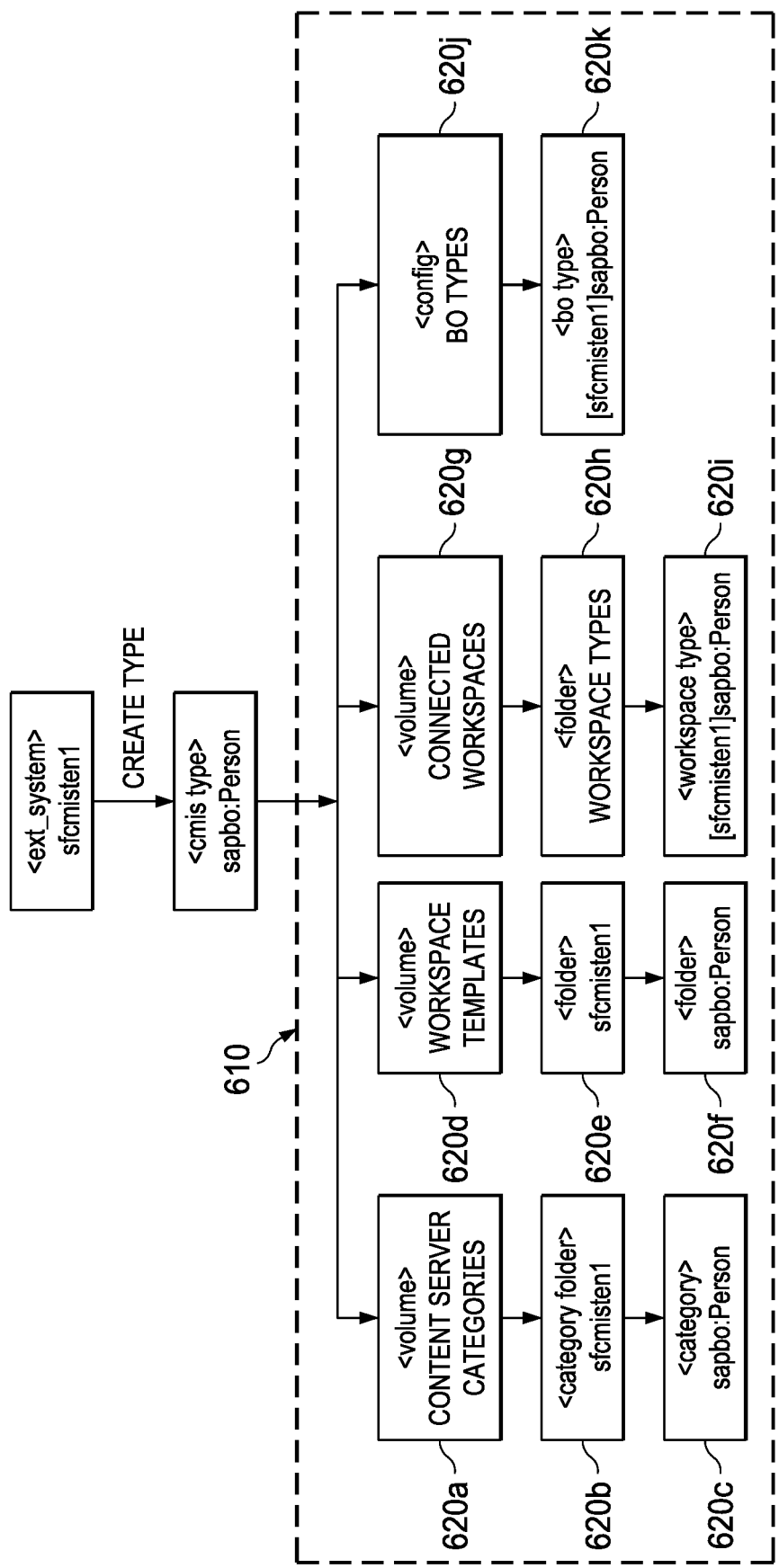
FIG. 6 is a block diagram of an example workspace configuration.

It may be helpful to an understanding of certain embodiments to illustrate particular non-limiting examples in more detail. Moving then to FIG. 6, a block diagram depicting one embodiment of a portion of a workspace configuration is presented. In this example, the external system "sfcmisten1" has issued a CMIS create type request for a secondary type of sapbo:Person. As this is a secondary type that inherits from the sapbo:Base, when the ECM system receives this request it will determine that the request secondary type is the requested secondary type is associated with a secondary type specified in the CMIS adapter configuration.

The ECM system may update the workspace configuration 610 based on the secondary type sapbo:Person. Here, the workspace configuration 610 includes a hierarchy of ECM native artifacts representing categories of secondary types for which native artifacts are being created where those categories may be associated with the named leading system. Specifically, the workspace configuration 610 may include a volume artifact 620a corresponding to ECM categories, a sub artifact category folder 620b corresponding to the leading system that issued the request "sfcmisten1", and a sub artifact category 620c corresponding to the requested secondary type sapbo:Person.

The workspace configuration 610 may also include a workspace template specifying how the native workspace for the secondary type sapbo:Person is to be created. For example, the workspace configuration 610 may include a volume 620d corresponding to workspace templates, a sub artifact folder 620e corresponding to the leading system that issued the request "sfcmisten1", and a sub artifact folder 620f corresponding to the requested secondary type sapbo:Person. This sub artifact folder 620f corresponding to the requested secondary type sapbo:Person may include the actual workspace template for creation of a workspace for an instance of a sapbo:Person. The template can specify a structure, such as other native ECM artifacts (e.g., sub-folders or objects), that should be created in association with the native ECM workspace to create for an instance of sapbo:Person.

The workspace configuration 610 may also specify workspaces as connected (e.g., created or accessible by a leading system or through user interfaces associated therewith). For example, the workspace configuration 610 may include a volume 620g corresponding to connected workspaces, a sub artifact folder 620h corresponding to workspace types, and a sub artifact workspace type 620i specifying that the leading system "sfcmisten1" has a workspace type for the sapbo:Person secondary type. Additionally, in certain embodiments where workspaces are being created in the ECM based on secondary types that inherit from a base secondary type (e.g., a boBase) the workspace configuration 610 may also specify these secondary types in association with the system that created them. Thus, workspace configuration may include a config artifact 620j associated with the base secondary type (e.g., "BO types") and a sub artifact folder 620k specifying that the leading system "sfcmisten1" has a secondary type (sapbo:Person) associated with that secondary type (e.g., that sapbo:Person is a BO type).

Figure 7:
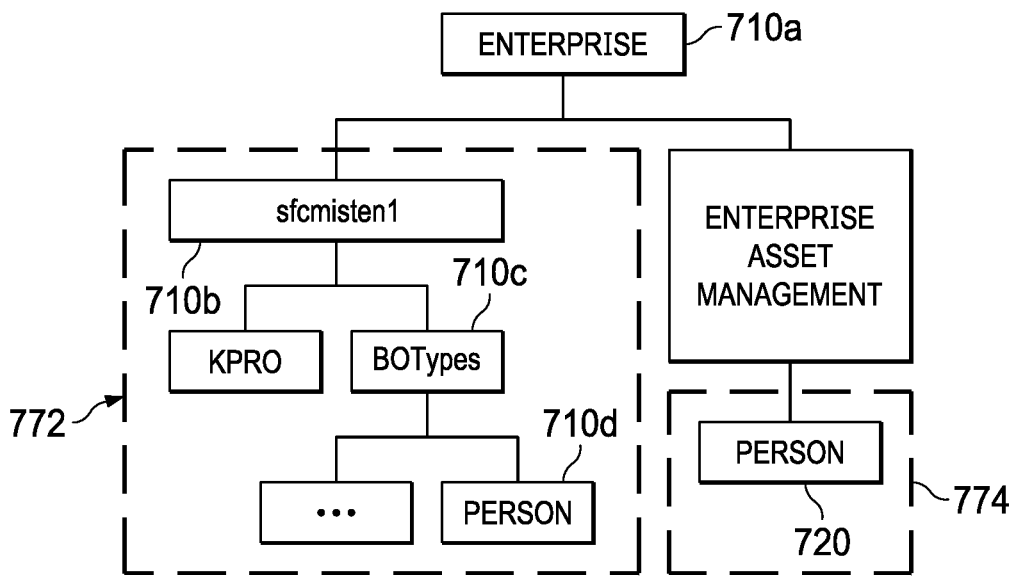
FIG. 7 is a block diagram of an example of structures that are employed by an embodiment of an ECM system.

Moving on to FIG. 7, a block diagram representing example portions of structures in the repository of an ECM system when a sapbo:Person secondary type is created by the "sfcmisten1" leading system is presented. The ECM system may maintain a CMIS specific structure 772 and an ECM specific structure 774. Both of these structures may be maintained in a portion of the repository associated with the enterprise to which the leading system ("sfcmisten1") belongs. For example, these structures 772, 774 may both be sub artifacts or stored as sub nodes, of enterprise object 710a corresponding to the enterprise. Thus, when a leading system ("sfcmisten1") of the enterprise is configured in the ECM system a CMIS object or folder 710b corresponding to the leading system ("sfcmisten1") may be created in the CMIS specific structure 772.

Moreover, a CMIS object 710c that is a sub-object or node of the leading system object 710b may be created as a node in the CMIS specific structure 772 that represents objects of a particular secondary type (boBase or BO Type) for which associated workspaces are to be created. Accordingly, when a CMIS request for a creation for a secondary type of this kind (or which inherits from a secondary type of this kind is received), a corresponding CMIS object 710d ("Person") in the CMIS specific structure 772 is created for that secondary type ("Person"). A corresponding artifact 720 representing that CMIS secondary type ("Person") may also be created in the ECM specific structure 774 at the ECM system. It will be noted that the portion of ECM specific structure 774 corresponding to the leading system ("sfcmisten1") may be created as siblings of, or otherwise associated with, the folder of root of leading system ("sfcmisten1"), thus there may not be a need to create an root node or artifact in the ECM specific structure 774 for the leading system ("sfcmisten1") in certain embodiment, while in other embodiments, such a node for the leading system may also be created in ECM specific structure 774.

Figure 8:
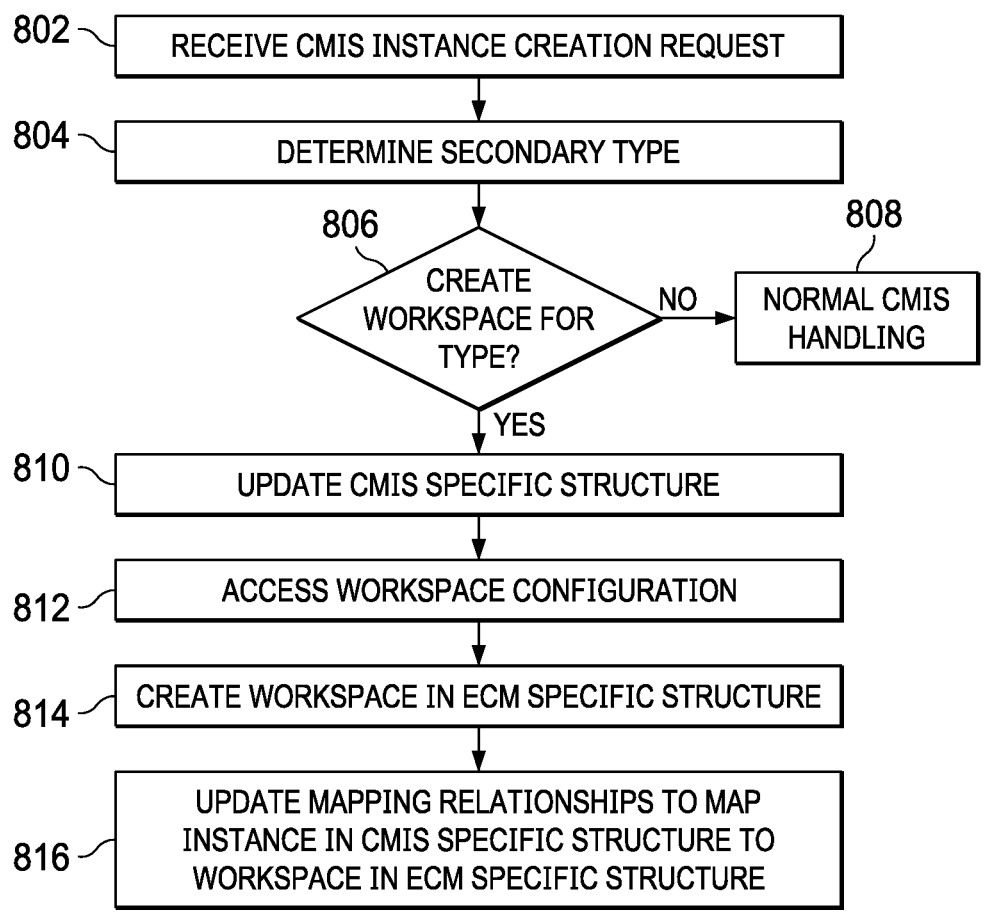
FIG. 8 is a flow diagram of a method that may be implemented by an embodiment of an ECM system.

FIG. 8 depicts one embodiment a method for creation of an object of a CMIS secondary type and an associated workspace in an ECM system that provides enhanced content management interoperability. When a CMIS request for creation of an instance of a secondary type is received from the CMIS client system (e.g., a create type request) (step 802) the secondary type (and possibly any base or parent secondary types from the request) may be determined (step 804). A determination can then be made to determine if the secondary type of the requested instance is a secondary type for which a workspace should be created (step 806). This determination may be made by accessing the workspace configuration and determining if the secondary type of the CMIS object being created is in the workspace configuration is association with the leading system that issued the request. For example, it can be determine if a received CMIS request is for a creation of an object of a secondary type of sapbo:boBase or a secondary type that inherits from this secondary type (e.g., sapbo:Person) by accessing the workspace configuration using an identifier for the leading system and determining if an artifact representing that secondary type is included in the workspace configuration. Alternatively, this may be done by accessing the CMIS adapter configuration to see if the secondary type is listed in the configuration of the CMIS adapter.

If the received request for creating a CMIS object (e.g., folder) of the secondary type is not associated with a CMIS secondary type specified in the workspace configuration in association with the leading system (N branch of step 806), the creation of the object for the secondary type request may be handled in a normal manner by the ECM system (step 808) (e.g., it may update CMIS specific structure). If, however, the received request for creating a CMIS object of the secondary type is associated with a secondary type specified in the workspace configuration in association with the leading system (Y branch of step 806), the ECM system may update both the CMIS specific structure (step 810) and the ECM specific structure (step 814) based on the object creation request. A CMIS object for the requested instance of the secondary type may be created in the CMIS specific structure. Additionally, a native ECM workspace specified for the requested CMIS secondary type may be created in the associated hierarchy of native ECM artifacts in the ECM specific structure. Specifically, the template for the workspace to create for the secondary type specified in the request may be accessed in the workspace configuration (step 812) based on the name of the leading system that issued the request (e.g., "sfcmisten1") and the secondary type of the requested object (e.g., "sapbo:Person") and the native ECM workspace artifact may be created (step 814) according to the workspace template specified for that secondary type in the workspace configuration.

The native ECM workspace artifact for the instance of the secondary type created in the ECM specific structure may be associated (e.g., beneath or a sub-node) with the ECM artifact in the ECM specific structure representing the CMIS secondary type. Moreover, mapping relationships mapping CMIS objects in the CMIS specific structure to corresponding native workspaces in the ECM specific structure may be updated to link the CMIS object created for the instance in the CMIS specific structure with the workspace created for that object in the ECM specific structure (step 816). In this manner, the ECM workspace for that instance in the ECM specific structure may be easily located when access or reference to that CMIS object (or CMIS secondary type) are utilized in subsequent CMIS requests received from the CMIS client system.

Figure 9:
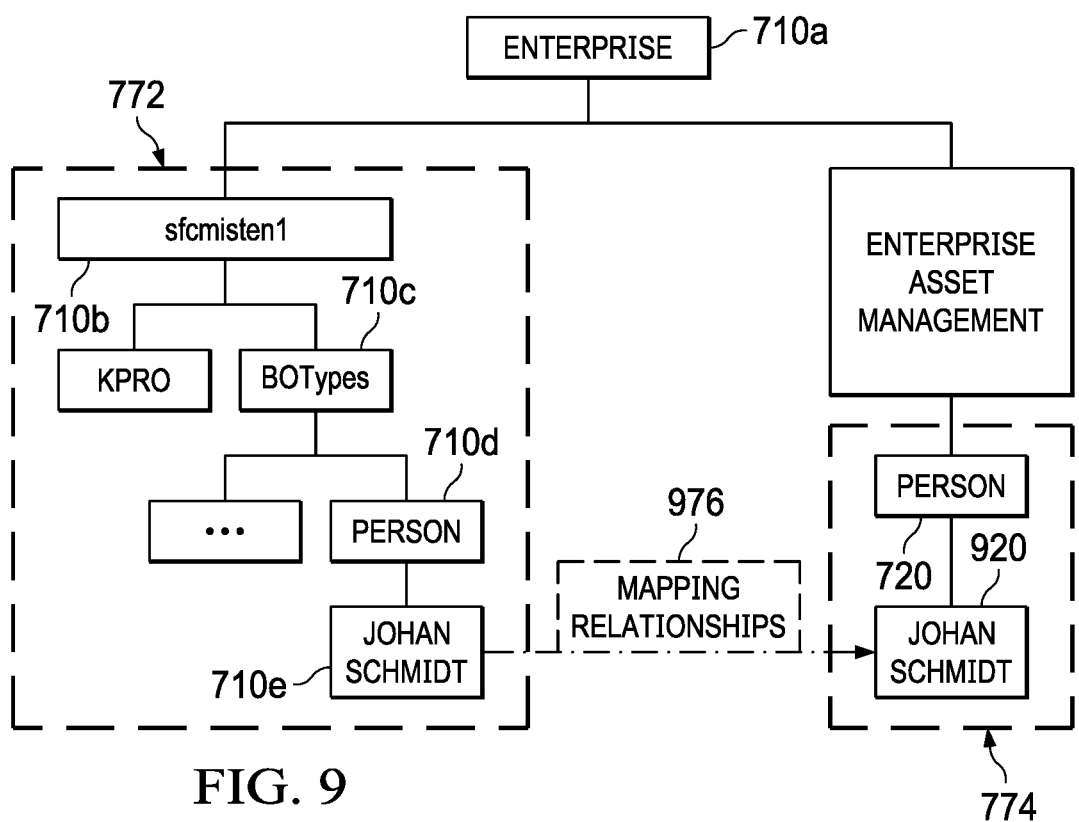
FIG. 9 is a block diagram of an example of structures that are employed by an embodiment of an ECM system.

Continuing with the above example and referring to FIG. 9, a block diagram depicting example portions of structures in the repository of an ECM system when an object of the type sapbo:Person secondary type is created by the "sfcmisten1" leading system is presented. As described, the ECM system may maintain a CMIS specific structure 772 and an ECM specific structure 774. Both of these structures may be maintained in a portion of the repository associated with the enterprise to which the leading system ("sfcmisten1") belongs. For example, these structures 772, 774 may both be sub artifacts or stored as sub nodes, of enterprise object 710*a* corresponding to the enterprise. When a leading system ("sfcmisten1") of the enterprise is configured in the ECM system a CMIS object or folder 710*b* corresponding to the leading system ("sfcmisten1") is created in the CMIS specific structure 772. Moreover, a CMIS object 710*c* that is a sub-object or node of the leading system object 710*b* represents objects of a particular secondary type (boBase or BO Type) for which associated workspaces are to be created, and a CMIS object 710*d* ("Person") in the CMIS specific structure 772 is created for that secondary type ("Person"), with a corresponding artifact 720 representing that CMIS secondary type ("Person") also exists in ECM specific structure 774 at the ECM system.

In this example, when a request for a creation of an instance (Johan Schmidt) of a sapbo:Person secondary type is received at the ECM system it is determined that the secondary type corresponding to the requested object is a secondary type for which a workspace should be created. For example, by accessing a workspace configuration (e.g., workspace configuration 610) based on the name of the leasing system (e.g., "sfcmisten1" or the secondary type, it can be determined that the sapbo:Person secondary type is a BO type for which a workspace should be created for that leading system ("sfcmisten1"). The workspace template for that secondary type and the leading system may also be obtained from the workspace configuration. For example, from workspace configuration 610, the-volume 620*d* corresponding to workspace templates, sub artifact folder 620*e* corresponding to the leading system that issued the request "sfcmisten1", and sub artifact folder 620*f* corresponding to the requested secondary type sapbo:Person may be accessed to obtained the actual workspace template for creation of a workspace for an instance of a sapbo: Person.

Here, a CMIS object 710*e* that is a sub-object or node of the CMIS object 710*d* ("Person") in the CMIS specific structure 772 is created for that secondary type instance ("Johan Schmidt"). A corresponding workspace 920 representing that CMIS secondary type instance ("Johan Schmidt") of that secondary type ("Person") may also be created in the ECM specific structure 774. This workspace 920 may be created as a sub node of a corresponding artifact 720 representing that CMIS secondary type ("Person") in the ECM specific structure 774. The workspace 920 may be created based on the template for that workspace for that secondary type obtained from the workspace configuration.

Additionally, mapping relationships 976 may be updated to link the CMIS object 710*e* in the CMIS specific structure 772 created for that secondary type instance ("Johan Schmidt") with the corresponding workspace 920 representing that CMIS secondary type instance ("Johan Schmidt") created in the ECM specific structure 774. This relationship may be CMIS relationships of a particular type such that they have a particular semantic meaning associating a CMIS object with a workspace (e.g., a cmis:bo-workspace relationship, a BO-BO relationship, a BO-workspace relationship or another type of relationship).

Figure 10:
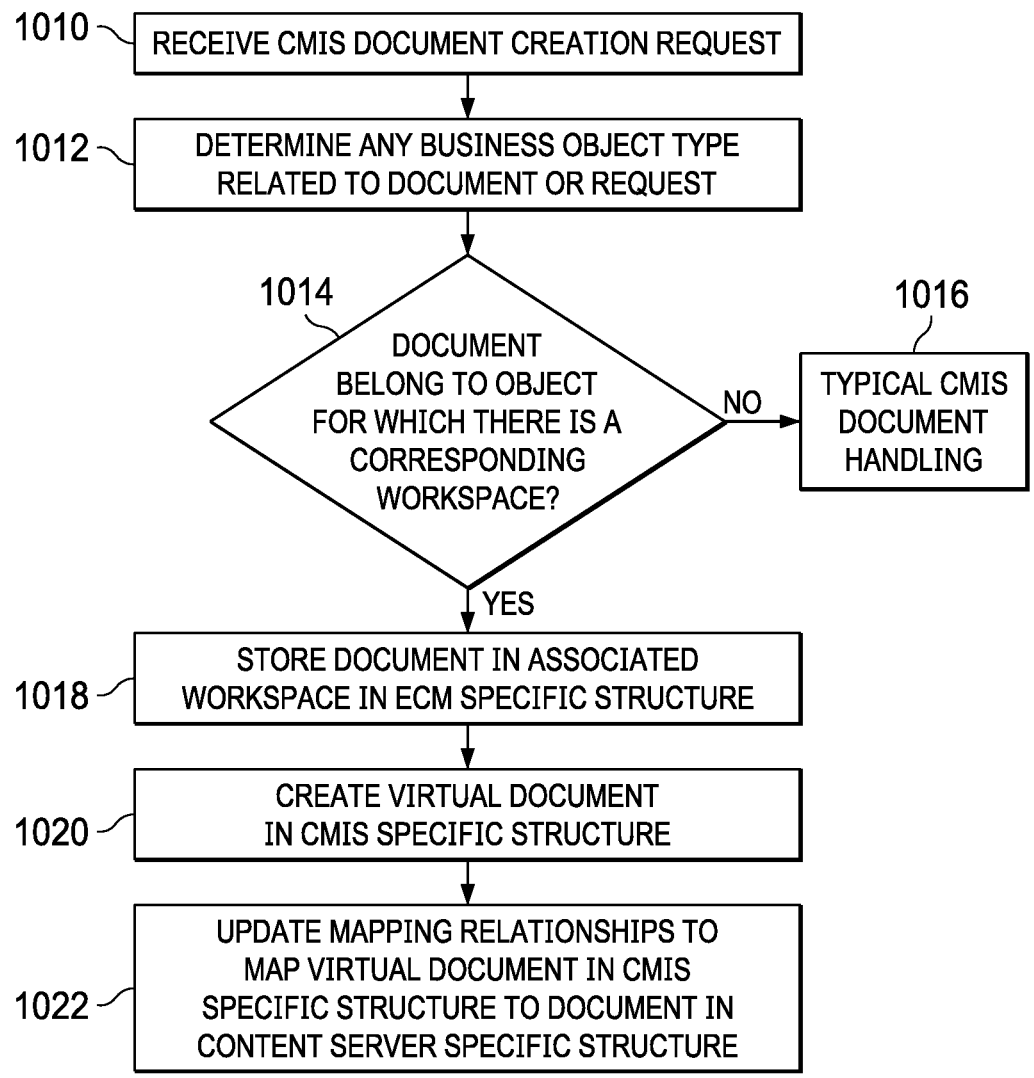
FIG. 10 is a flow diagram of a method that may be implemented by an embodiment of an ECM system.

FIG. 10 depicts one embodiment a method for creation of a document or other object of a CMIS secondary type in an ECM system that provides enhanced content management interoperability. When a content request from a leading system according to CMIS (e.g., the creation of documents, items, folder or otherwise to store content in association with a created instance of a secondary type) (step 1010), the ECM system can determine if the request specifies a secondary type or an object of that secondary type for which a native workspace exists in the ECM specific structure (step 1014). Such a determination may be made, for example, by accessing the CMIS specific structure at the ECM system to locate the object in the CMIS specific structure corresponding to the CMIS object or secondary type referenced in the received CMIS create document request (step 1012).

Based on the object in the CMIS specific structure located it can be determined if a corresponding workspace object exists in the ECM specific structure (step 1014) using mapping relationships at the ECM system by determining if any link between the CMIS object created for the instance in the CMIS specific structure and any native ECM workspace in the ECM specific structure exists in the mapping relationships. In particular, an identifier for the CMIS object in the CMIS specific structure may be used as an index into the mapping relationships to determine if a relationship of a particular type (e.g., a cmis:bo-workspace relationship, a BO-Workspace or BO-BO relationship) exists between that CMIS object and any workspace.

If no associated workspace exists (N branch of step 1014) the ECM may handle the document creation request in a normal manner (step 1016). However, if a link between the CMIS object in the CMIS specific structure and a workspace exists (Y branch of step 1014), using this link the corresponding ECM workspace in the ECM specific structure may be located and the document stored in association with (e.g., beneath or a sub-node of) the native ECM workspace created for that object of the CMIS secondary type (step 1018). Moreover, a CMIS object or other type of entry for that document (a virtual document) may be created in the CMIS specific structure in association with the CMIS object for the object of the secondary type (step 1020). In one embodiment, the set of mappings may also be updated to link the CMIS object or entry for the document (the virtual document) in the CMIS specific structure with the document in the ECM workspace in the ECM specific structure (step 1022).

Figure 11:
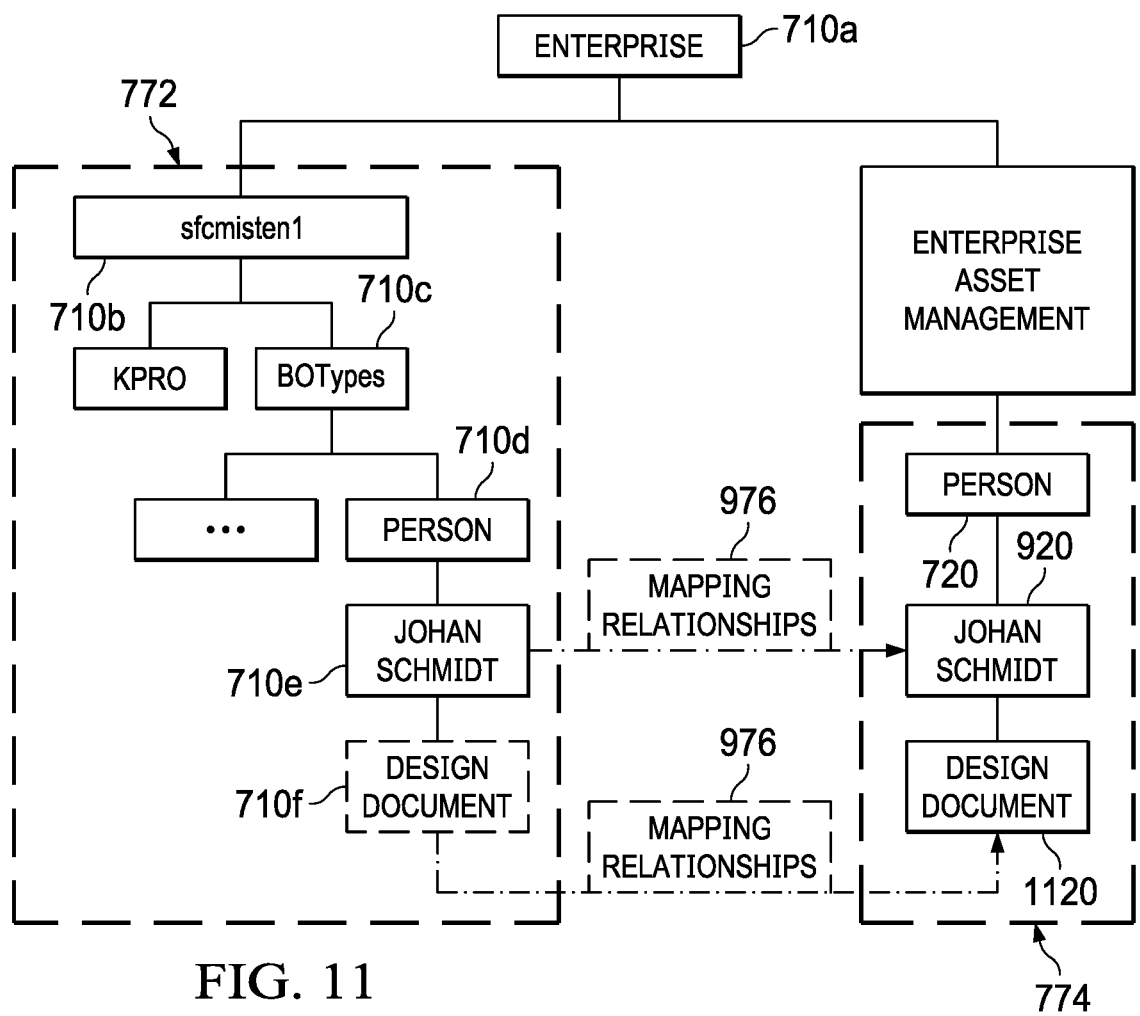
FIG. 11 is a block diagram of an example of structures that are employed by an embodiment of an ECM system.

Again continuing with the above example and now referring to FIG. 11, a block diagram depicts example portions of structures in the repository of an ECM system when a "Design Document" is stored for the Person secondary type instance "Johan Schmidt" by the "sfcmisten1" leading system. As described, the ECM system may maintain a CMIS specific structure 772 and an ECM specific structure 774. Both of these structures may be maintained in a portion of the repository associated with the enterprise to which the leading system ("sfcmisten1") belongs. For example, these structures 772, 774 may both be sub artifacts or stored as sub nodes, of enterprise object 710*a* corresponding to the enterprise.

When a leading system ("sfcmisten1") of the enterprise is configured in the ECM system a CMIS object or folder 710*b* corresponding to the leading system ("sfcmisten1") is created in the CMIS specific structure 772. Moreover, a CMIS object 710*c* that is a sub-object or node of the leading system object 710*b* represents objects of a particular secondary type (boBase or BO Type) for which associated workspaces are to be created, and a CMIS object 710*d* ("Person") in the CMIS specific structure 772 is created for that secondary type ("Person"), with a corresponding artifact 720 representing that CMIS secondary type ("Person") also exists in ECM specific structure 774 at the ECM system. Additionally in this example, a CMIS object 71*ed* that is a sub-object or node of the CMIS object 710*d* ("Person") in the CMIS specific structure 772 exists for secondary type instance ("Johan Schmidt") along with a corresponding workspace 920 for that CMIS secondary type instance ("Johan Schmidt") in the ECM specific structure 774 that exists as a sub node of a corresponding artifact 720 representing that CMIS secondary type ("Person") in the ECM specific structure 774. Mapping relationships 976 link the CMIS object 710*e* in the CMIS specific structure 772 created for that secondary type instance ("Johan Schmidt") with the corresponding workspace 920 representing that CMIS secondary type instance ("Johan Schmidt") created in the ECM specific structure 774.

Accordingly, when a CMIS request to create a document in association with the CMIS secondary type instance ("Johan Schmidt") of secondary type "Person" is received at the ECM system from leading system "sfcmisten1", CMIS specific structure 772 can be accessed to determine the CMIS object 710*e* associated with that secondary type instance ("Johan Schmidt"). Using an identifier for the CMIS object 710*e* for that secondary type instance ("Johan Schmidt") the mapping relationships 976 may be accessed to determine that there is a relationship between the CMIS object 710*e* for that secondary type instance ("Johan Schmidt") and a corresponding workspace 920 for that CMIS secondary type instance ("Johan Schmidt") of that secondary type ("Person") in the ECM specific structure 774. This relationship may be CMIS relationships of a particular type such that they have a particular semantic meaning associating a CMIS object with a workspace (e.g., a cmis:bo-workspace relationship, a BO-BO relationship, a BO-workspace relationship or another type of relationship).

The document ("Design Document") 1120 can then be stored in association with (e.g., beneath or a sub-node of) the native ECM workspace ("Johan Schmidt" 920) created for that object of the CMIS secondary type ("Johan Schmidt"). Moreover, a CMIS object for the document (a virtual document), ("Design Document" 710*f*) is created in the CMIS specific structure 772 in association with the CMIS object "Johan Schmidt" 710*e* for the object of the secondary type. In one embodiment, the set of mappings 976 is also updated to link the "Design Document" 710*f* virtual document in the CMIS specific structure 772 with the actual document ("Design Document" 1120) in the ECM workspace ("Johan Schmidt" 920) in the ECM specific structure 774.

In this manner, native ECM workspace artifacts may be created that correspond to created CMIS secondary types and documents stored and managed according to the native workspace artifacts and structures of ECM system, while allowing access and interaction with CMIS client systems according to the CMIS protocol and domain model. Moreover, because such workspace artifacts and documents are created, managed and stored according to the native ECM domain model of ECM system the full suite of functionality and interfaces offered by the ECM system may be made available with respect those workspace artifacts and documents from a wide variety of systems or applications.

Moreover, the systems or applications that interact with the ECM system to access such ECM workspace artifacts and documents may do so despite the fact that the workspaces and documents being accessed were created based on CMIS interactions from a CMIS client system. Embodiment may therefore provide the advantage of not only enabling interoperability through the use of CMIS with CMIS clients but to extend such interoperability to other systems that do not conform to CMIS, while in many cases preserving the functionality of the ECM while doing so.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. An enterprise content management system (ECM), comprising:
    a Content Management Interoperability Services (CMIS) interface;
    a ECM services interface;
    a repository storing a CMIS specific structure, an ECM specific structure and a set of mapping relationships;
    a non-transitory computer readable medium comprising instructions for:
        receiving a first request to create a first object of a secondary type from a CMIS compliant leading system through the CMIS interface;
        accessing the CMIS specific structure to locate an object in the CMIS specific structure corresponding to the secondary type of the first object;
        determining, based on the set of mapping relationships between the located object and a plurality of native workspaces in the ECM specific structure, whether a native workspace of the plurality of workspaces is associated with the located object exists in the ECM specific structure;
        if it is determined that a native ECM workspace of the plurality of workspaces associated with the located object in the CMIS specific structure corresponding to the secondary type of the first object does not exist in the ECM specific structure, handling the first request in a normal manner, including updating the CMIS specific structure;
        if it is determined that the native ECM workspace of the plurality of workspaces associated with the located object in the CMIS specific structure corresponding to the secondary type of the first object exists in the ECM specific structure:
            storing the first object in association with the determined existing native ECM workspace;
            creating a virtual document in the CMIS specific structure in association with the first object of the secondary type; and
            updating the mapping relationships to link the virtual document in the CMIS specific structure to the associated workspace.

2. The system of claim 1, wherein the first object comprises a document.

3. The system of claim 1, wherein the first object comprises a folder.

4. The system of claim 1, wherein determining whether the native workspace associated with the located object exists in the ECM specific structure further comprises determining if any link exists between the located object and any native workspaces in the ECM specific structure in the set of mapping relationships.

5. The system of claim 4, wherein an identifier for the located object is used as an index into the set of mapping relationships to determine if a relationship of a particular secondary type exists between that located object and any native workspace.

6. The system of claim 1, wherein the first object is stored as a sub-node of the determined workspace.

7. A method, comprising:
receiving, at an enterprise content management system (ECM) system, a first request to create a first object of a secondary type from a Content Management Interoperability Services (CMIS) compliant leading system through a CMIS interface;
accessing a CMIS specific structure stored in a repository to locate an object in the CMIS specific structure corresponding to the secondary type of the first object;
determining, based on a set of mapping relationships stored in the repository between the located object and a plurality of native workspaces in an ECM specific structure stored in the repository, whether a native workspace of the plurality of workspaces is associated with the located object exists in the ECM specific structure;
if it is determined that a native ECM workspace of the plurality of workspaces associated with the located object in the CMIS specific structure corresponding to the secondary type of the first object does not exist in the ECM specific structure, handling the first request in a normal manner, including updating the CMIS specific structure;
if it is determined that the native ECM workspace of the plurality of workspaces associated with the located object in the CMIS specific structure corresponding to the secondary type of the first object exists in the ECM specific structure:
storing the first object in association with the determined existing native ECM workspace;
creating a virtual document in the CMIS specific structure in association with the first object of the secondary type; and
updating the mapping relationships to link the virtual document in the CMIS specific structure to the associated workspace.

8. The method of claim 7, wherein the first object comprises a document.

9. The method of claim 7, wherein the first object comprises a folder.

10. The method of claim 7, wherein determining whether the native workspace associated with the located object exists in the ECM specific structure further comprises determining if any link exists between the located object and any native workspaces in the ECM specific structure in the set of mapping relationships.

11. The method of claim 10, wherein an identifier for the located object is used as an index into the set of mapping relationships to determine if a relationship of a particular secondary type exists between that located object and any native workspace.

12. The method of claim 7, wherein the first object is stored as a sub-node of the determined workspace.

13. A non-transitory computer readable medium storing instructions for:

receiving, at an enterprise content management system (ECM) system, a first request to create a first object of a secondary type from a Content Management Interoperability Services (CMIS) compliant leading system through a CMIS interface;
accessing a CMIS specific structure stored in a repository to locate an object in the CMIS specific structure corresponding to the secondary type of the first object;
determining, based on a set of mapping relationships stored in the repository between the located object and a plurality of native workspaces in an ECM specific structure stored in the repository, whether a native workspace of the plurality of workspaces is associated with the located object exists in the ECM specific structure;
if it is determined that a native ECM workspace of the plurality of workspaces associated with the located object in the CMIS specific structure corresponding to the secondary type of the first object does not exist in the ECM specific structure, handling the first request in a normal manner, including updating the CMIS specific structure;
if it is determined that the native ECM workspace of the plurality of workspaces associated with the located object in the CMIS specific structure corresponding to the secondary type of the first object exists in the ECM specific structure:
storing the first object in association with the determined existing native ECM workspace;
creating a virtual document in the CMIS specific structure in association with the first object of the secondary type; and
updating the mapping relationships to link the virtual document in the CMIS specific structure to the associated workspace.

14. The non-transitory computer readable medium of claim 13, wherein the first object comprises a document.

15. The non-transitory computer readable medium of claim 13, wherein the first object comprises a folder.

16. The non-transitory computer readable medium of claim 15, wherein determining whether the native workspace associated with the located object exists in the ECM specific structure further comprises determining if any link exists between the located object and any native workspaces in the ECM specific structure in the set of mapping relationships.

17. The non-transitory computer readable medium of claim 13, wherein an identifier for the located object is used as an index into the set of mapping relationships to determine if a relationship of a particular secondary type exists between that located object and any native workspace.

18. The non-transitory computer readable medium of claim 13, wherein the first object is stored as a sub-node of the determined workspace.

19. The non-transitory computer readable medium of claim 13, wherein the secondary type is a sapbo: boBase secondary type.

* * * * *